Patented Oct. 26, 1954

2,692,872

UNITED STATES PATENT OFFICE 2,692,872

COAGULATING UNSATURATED ORGANIC COMPOUND-SULFUR DIOXIDE RESINS

Robert J. Fanning, Bartlesville, Okla., assignor to Phillips Petroleum Company, a corporation of Delaware No Drawing. Application January 3, 1952, Serial No. 264,833

14 Claims. (Cl. 260—45.5)

This invention relates to a method for the coagulation of latices, for example latices produced by the interaction of unsaturated organic compounds with sulfur dioxide, to produce improved resins in a novel and improved manner. In one of its aspects the method of the invention relates to the coagulation of a resin-containing latex employing no additional substance which is other than a portion of the resin to be produced. In another of its aspects the method of the invention relates to the coagulation of a resin-containing latex employing for this purpose, as a coagulant, a resin which has been produced by the interaction of an unsaturated, organic compound with sulfur dioxide. In still another aspect the invention relates to the coagulation of a latex containing a resin produced by the emulsion polymerization of a polymerizable unsaturated organic compound, having a point of unsaturation between adjacent carbon atoms, and sulfur dioxide employing as a coagulant an already coagulated resin either in the wet or dry state, i. e., as a latex which has been subjected to coagulation, filter cake or as a dry, powdered resin, for example a resin substantially identical in properties with the resin in the latex to be coagulated. As a further aspect of the invention it relates to articles of improved clarity or transparency.

The preparation of resins by the interaction of unsaturated organic compounds with sulfur dioxide by emulsion polymerization methods is described and claimed in Serial No. 8,755, now U. S. Patent No. 2,645,631, filed February 16, 1948, by Willie W. Crouch and Ernest W. Cotten. When so prepared, the resins are formed as small particles in emulsion in an aqueous medium. Said aqueous emulsion is called the latex and in addition to the resin particles, contains an emulsifier, catalyst and other materials employed in the polymerization reaction. When coagulating these so-called olefin-sulfur dioxide resins from such latices with a saturated aqueous solution of an inorganic salt, for example, aluminum sulfate, ammonium sulfate, ammonium nitrate or magnesium sulfate or with a brine-alcohol medium by which methods satisfactory finely divided coagula are obtained, there is required the addition of substantial amounts of extraneous materials to the latex and in the case of alcohol the additional cost of providing and operating a recovery system for removing the alcohol from the serum. In addition it has been found that many of the coagulating agents have an adverse effect on the clarity of molded articles produced from the resins. For example, molded articles prepared from resins coagulated with the said inorganic salts are characterized by the presence of numerous small white flocs which render the specimens substantially non-transparent. This is more pronounced in the cases of the aluminum and ammonium salts mentioned than in the case of magnesium sulfate.

I have now discovered a novel method for coagulating olefin-sulfur dioxide resins from latices containing the same wherein an already coagulated resin either in the wet or dry state, for example, a dry, powdered olefin-sulfur dioxide resin is employed as the coagulating agent and wherein the aforementioned disadvantages and difficulties of operation are overcome. It is an advantage of my novel process that resin powders are produced which provide molded articles of improved clarity.

According to my process a finely divided resin, for example, an olefin-sulfur dioxide resin, preferably as a dry powder, is added to an olefin-sulfur dioxide resin latex, suitably at room temperature, and at atmospheric pressure, preferably in an amount of from 5 to 20 per cent of the weight of the latex. The resin is thoroughly admixed with the latex by stirring or other suitable means and the mixture is gradually heated to raise the temperature thereof until coagulation of the resin in the latex is effected, conditions being adjusted as further set forth below to provide coagulation at a temperature preferably not to exceed 65° C. The coagulated resin is then suitably treated to improve particle size, such as by adding a volume of water equal to the volume of the resin slurry and heating said slurry with agitation to a temperature of about 75° C. for a brief period. The resin is recovered by filtration, washed and dried, and is then ready for use, such as for fabrication into molded articles by compression molding methods or other suitable means.

Resin latices applicable to use according to the method of the present invention include those produced by the interaction of selected unsaturated organic compounds which are polymerizable with sulfur dioxide by emulsion polymerization methods. Suitable reactants and one suitable method for the production of these latices is disclosed in the above identified copending application by Willie W. Crouch and Ernest W. Cotten. These latices will preferably contain from about 23 to 35 weight per cent of solids, however, it is to be included within the scope of the present disclosure to employ latices containing solids contents different from these values.

It will usually be convenient to add the olefine-sulfur dioxide resin powder to the latex at the temperature at which it comes from the reactor, particularly when operating a continuous process. However, any suitable temperature preferably below about 65° C. and preferably above 0° C. is included within the scope of the present invention. I have found that when the dry resin powder is added to the latex when the latter is at room temperature (about 20° C.), it is usually necessary to heat the mixture of latex and dry resin powder to a temperature in the range from about 28 to 50° C. to effect coagulation.

It has been found that the temperature at which the resin coagulates from the latex after the dry resin has been added thereto varies substantially inversely with the amount of dry resin added. Therefore the coagulation temperature can be controlled over a limited range by varying the amount of dry resin powder employed, thus providing most efficient processing. The amount of dry resin powder added will normally be within the range of 5 to 20 weight per cent of the latex when employing latices containing relatively high solids contents, namely solids contents in the range from about 28 to 35 weight per cent, for example 30 weight per cent. However, I do not wish to be bound by these limits since latices containing solids contents varying from these values may require more or lesser amounts of resin powder to effect coagulation and such operation is included within the scope of my invention. Conditions are preferably adjusted to effect coagulation at a temperature somewhat above room temperature (20° C.) but preferably not above about 65° C. Temperatures above 65° C. are preferably avoided to prevent softening the resin particles to such an extent that said particles fuse together and form large masses which are difficult to handle in subsequent processing steps. During the treatment to improve particle size, subsequent to the coagulation, temperatures ranging as high as 75° C. can be employed since the latex is diluted with water prior to such treatment.

Finely divided olefin-sulfur dioxide resin powders of about 30 mesh or smaller are suitable for use in the present process. The finer powders are usually more quickly wetted with resultant rapid coagulation. I have found that a resin powder which has been passed through a 35 mesh sieve provides excellent coagulation. Instead of powders, coagulated latices can be used, as noted.

It is within the scope of the present invention to employ known coagulating agents such as acetic acid, potassium acetate, magnesium sulfate and the like in small amounts in combination with dry resin powders, as herein disclosed, to effect coagulation of olefin-sulfur dioxide resins from latices containing the same. Such combinations of coagulating agents are advantageously applicable to the coagulation of resins from latices of low solids content since said low solids latices usually require the addition of larger amounts of resin powder per se or higher temperatures to effect coagulation.

It is an advantage of the present invention that, in a continuous emulsion polymerization process wherein the resin is coagulated from the latex as said latex is removed from the polymerization zone, a portion of the dried resin product can be recycled to the coagulation zone to effect coagulation. Thus no extraneous materials are necessary for operation of the process as contrasted with methods of the prior art wherein alcohol, magnesium sulfate or the like were employed as coagulants.

It is a further advantage of the present process that it is applicable to the treatment of stable latices from which it is frequently difficult or impossible to coagulate resins employing known coagulants such as, for example, magnesium sulfate. This advantage is illustrated by Example II wherein resin coagulation is readily effected when employing a very stable commercial 1-butene-sulfur dioxide resin latex which could not be coagulated by an aqueous solution of magnesium sulfate.

EXAMPLE I

A. *The polymerization*

An olefin-sulfur dioxide resin was prepared using the following emulsion recipe in a one gallon stainless steel autoclave:

| Component: | Parts by weight |
| --- | --- |
| 1-butene (pure, 99 mol per cent) | 46.7 |
| Sulfur dioxide | 88.3 |
| Maprofix MM [1] | 1.0 |
| Ammonium nitrate | 0.5 |
| Water | 180 |

[1] Sodium laurylsulfate dispersing agent commercially available in the form of a paste containing about 60 per cent solids.

The polymerization was conducted for a period of 5 hours at an average temperature of 35° C., and over a pressure range from 60 to 90 p. s. i. g.

At the end of the reaction period the reactor was opened and excess sulfur dioxide was vented therefrom. Coagulation was effected as described below. The latex had a solids content of approximately 33 to 34 weight per cent.

B. *The coagulation*

200 ml. of the olefin-sulfur dioxide resin latex, prepared as described above was treated to coagulate the resin therefrom by the addition of 15 grams of dried 1-butene-sulfur dioxide resin powder (35 mesh or smaller) with stirring and heating to 41° C. At said temperature the resin coagulated into a thick, heavy slurry. 250 ml. of distilled water (20° C.) was then added and the temperature raised to 75° C. with agitation to improve particle size. The coagulum was then filtered, reslurried once, refiltered and twice washed on the filter, and dried. The dried resin powder so recovered was compression molded at 150° C. and approximately 1250 p. s. i. Clear specimen was obtained.

C. *Coagulation control*

A control run was made employing a conventional coagulating agent wherein 200 ml. of the latex, prepared as described above was heated to 50° C. and 4 ml. of a saturated solution of magnesium sulfate added with stirring to effect coagulation into a thick, heavy slurry. 200 ml. of distilled water (20° C.) was added to the mixture and the mixture heated to 75° C. to improve particle size. The coagulum was filtered, reslurried once, refiltered and washed twice with distilled water on the filter and dried. The dried resin powder so recovered was compression molded at 150° C. and approximately 1250 p. s. i. A specimen was obtained containing a great number of white flocs of approximately one mm. diameter which were so numerous as to render the specimen substantially non-transparent, in contrast with the clear and transparent specimen obtained when operating according to the present invention.

EXAMPLE II

A. The polymerization

An olefin-sulfur dioxide resin was prepared using the following emulsion recipe in a one gallon stainless steel autoclave:

| Component: | Parts by weight |
|---|---|
| Commercial 1-butene [1] | 55.5 |
| Sulfur dioxide | 98.3 |
| Maprofix MM [2] | 0.6 |
| Ammonium nitrate | 1.0 |
| Water | 180 |

[1] The commercial 1-butene had the following composition:

| Component: | Mol per cent |
|---|---|
| 1-butene | 69.9 |
| 2-butene-cis | 2.7 |
| 2-butene-trans | 7.8 |
| n-Butane | 12.1 |
| Isobutane | 3.9 |
| $C_3$ | 0.7 |
| Isobutylene | 2.7 |
| Butadiene | 0.9 |

[2] Sodium laurylsulfate dispersing agent commercially available in the form of a paste containing about 60 per cent solids.

The polymerization was conducted for a period of 7 hours at an average temperature of 35° C., and over a pressure range from 60–70 p. s. i. g.

At the end of the reaction period the reactor was opened and excess sulfur-dioxide vented therefrom. The latex had a solids content of 32.65 weight per cent.

An additional quantity of olefin-sulfur dioxide resin latex was prepared using the recipe described above except that 1.0 part of Maprofix MM was employed. The polymerization was conducted for 7 hours at an average temperature of 35° C. and over a pressure range from 50–70 p. s. i. g. This latex had a solids content of 33.2 weight per cent.

The two latices were blended to provide a sample for the following coagulation study. These latices were extremely stable and resistant to coagulation with magnesium sulfate. Indeed, coagulation of the resin could not be effected with magnesium sulfate. The following description demonstrates that such stable latices are readily coagulated by the method of the present invention.

B. The coagulation

To 200 ml. of the aforementioned blended latices at 20° C. was added 30 grams of dry powdered 1-butene-sulfur dioxide resin which had been screened through a 35 mesh sieve. The mixture was then heated slowly and at 60° C., coagulation into a thick, heavy slurry was obtained. 300 ml. of distilled water was then added and the temperature raised to 75° C. with stirring to improve particle size. The slurry was cooled, and the resin was recovered by filtration, washed and dried.

EXAMPLE III

Coagulation of a large sample of olefin-sulfur dioxide resin

A. The polymerization

An olefin-sulfur dioxide resin was prepared using commercial 1-butene and sulfur dioxide in an emulsion polymerization recipe identical to that described in Example II wherein the polymerization was conducted for a period of 8 hours at an average temperature of 35° C., and over a pressure range from 60 to 87 p. s. i. g. The latex had a solids content of 33.2 weight per cent.

B. The coagulation

To 2573 grams of the latex prepared as described was added 306 grams of dried 1-butene-sulfur dioxide resin powder (35 mesh or smaller). The dried resin powder was equivalent to approximately 12 weight per cent of the latex. The dried resin was mixed thoroughly with the latex at 20° C. The mixture was then heated slowly and coagulation was obtained at 28° C. An equal volume of distilled water was added and the temperature of the mixture raised to 70° C. to improve particle size. The resin was then recovered by filtration, washed and dried.

EXAMPLE IV

A. The polymerization

Preparation and coagulation of a 94/6 commercial 1-butene-acrylonitrile blend-sulfur dioxide resin.

The resin was prepared using the following emulsion recipe in a one gallon stainless steel autoclave:

| Component: | Parts by weight |
|---|---|
| Commercial 1-butene [1] | 52.4 |
| Acrylonitrile | 2.81 |
| Sulfur dioxide (45 parts excess) | 98.3 |
| Maprofix MM [2] | 2.0 |
| Ammonium nitrate | 1.0 |
| Water | 180 |

[1] See Example II for analysis.
[2] See Example II for definition.

The polymerization was conducted for a period of 12 hours at an average temperature of 35° C., and over a pressure range from 70 to 88 p. s. i. g. At the end of the reaction period the reactor was opened and excess sulfur dioxide vented therefrom. The latex had a solids content of 32.8 weight per cent.

B. The coagulation

To 200 ml. of the latex prepared as described above was added 20 grams of dry powdered 1-butene-sulfur dioxide resin (35 mesh or smaller). The mixture was stirred and heated slowly and coagulation was obtained at 55° C. A heavy slurry formed. 230 ml. of distilled water (20° C.) was added and the temperature raised to 71° C. with stirring to improve particle size. The resin was recovered by filtration, washed and dried.

EXAMPLE V

To 200 ml. of 1-butene-sulfur dioxide resin latex prepared as described in Example I was added 20 grams of dried resin powder which had been passed through a 35 mesh sieve. The temperature of the mixture was then raised to 40° C. with stirring and 5 ml. of glacial acetic acid was added. The resin thereupon coagulated and a heavy slurry was formed. 200 ml. of distilled water was added and the temperature of the slurry was raised to 75° C. to improve resin particle size. The serum was somewhat cloudy but it was estimated that 95 per cent of the solids present in the original 200 ml. of latex were coagulated. Particle size was very large. The coagulum was filtered, reslurried and agitated at 40° C., cooled, refiltered, and the resin washed with distilled water and dried. The dried resin powder so recovered was compression molded at 150° C. and approximately 1250 p. s. i. to give a clear specimen.

EXAMPLE VI

The run of Example V was repeated employing 2 ml. of an aqueous solution of potassium acetate (40 gms. of potassium acetate/100 gms. solution) instead of acetic acid. After addition of the dry resin powder the mixture was slowly heated while the potassium acetate solution was added dropwise. When the temperature reached 31° C., coagulation was obtained. 220 ml. of distilled water (20° C.) was added and the temperature raised to 75° C. to improve particle size. The serum was light gray in color.

The percent of total resin coagulated was calculated by means of a solids content taken on the serum. It was found that 94.8 per cent of the resin had been coagulated.

A sample of dried resin powder recovered from the serum was compression molded at 150° C. and approximately 1250 p. s. i. A clear specimen was obtained.

The term "olefin-sulfur dioxide resin" is a term of the art and as employed therein and herein and in the appended claims is inclusive of the unsaturated organic compounds which are polymerizable with sulfur dioxide to form a resin, for example by emulsion polymerization as referred to herein. Said unsaturated organic compounds are characterized by the presence of a point of unsaturation between adjacent carbon atoms and are, for example, monoolefins and substituted monoolefins such as the normal butenes, pentenes, octenes, 4-cyclohexylbutene-1, and the like, cycloolefins such as cyclohexene, acetylenes, and polyfunctional unsaturated compounds such as allyl alcohol, vinyl acetate, allyl ethyl ether, ortho-allylanisole, ortho-allylphenol, parabromoallylbenzene, methyl undecylenate, undecylenyl alcohol, undecylenic acid, acrylonitrile, etc. Mixture of these olefins can also be employed to prepare the olefin-sulfur dioxide resins. The resins can be prepared by various methods, for example, by reacting sulfur dioxide with an olefin in the presence of an excess of the sulfur dioxide. The reaction can also be carried out in the presence of acetone or other solvent as a reaction medium. Another, and often preferred, method of preparing the resins is by the emulsion polymerization of the olefin and the $SO_2$ as described in said copending application Serial No. 8,755, filed February 16, 1948, by Willie W. Crouch and Ernest W. Cotten, and U. S. Patents Nos. 2,531,403 and 2,556,799.

Variation and modification are possible within the scope of the foregoing disclosure and appended claims to the invention the essence of which is that a coagulated latex or dry sub-divided resin can be added to a resin-containing latex to effect the coagulation thereof, with the concomitant results and advantages which have been set forth and described herein. The concept of the invention of the claims is in the effecting of the coagulation of the latex employing the resin, also in the employment of wet or dry resin and temperature increase of the latex, after admixture of the resin, in a correlated manner as set forth herein, and in the employment of a resin as set forth and described in conjunction with a known coagulant.

I claim:

1. A method for the production of a resin from an unsaturated organic compound polymerizable with sulfur dioxide to yield an unsaturated organic compound-sulfur dioxide resin which comprises obtaining a resin-containing latex by emulsion polymerization of such an organic compound and sulfur dioxide and then effecting coagulation thereof by admixture therewith of a coagulated, sub-divided unsaturated organic compound-sulfur dioxide resin in a proportion to the solids content of said latex sufficient to effect said coagulation.

2. A method according to claim 1 wherein the latex and resin admixture is heated to a temperature above 0° C. and not over about 65° C. to effect said coagulation.

3. A method according to claim 2 wherein the resin is present in the latex in a proportion by weight of the latex of 5–20 per cent and higher proportions of said resin, within said range, are employed to effect coagulation at lower temperature in said temperature range and vice versa.

4. The coagulation of an olefin-sulfur dioxide resin-containing latex, produced by emulsion polymerization and containing from about 28 to about 35 weight per cent solids, which comprises adding to said latex 5–20 per cent of the weight thereof of a finely divided, coagulated, olefin-sulfur dioxide resin and then heating and stirring the admixture at a temperature not over about 65° C. to effect coagulation of said latex.

5. A method according to claim 4 wherein the coagulated latex slurry is diluted with water and agitated at a temperature below about 75° C. to improve particle size of the resin.

6. A method for producing a transparent resin product which comprises preparing an aqueous emulsion of an unsaturated organic compound, polymerizable with sulfur dioxide to produce a resin-containing latex, polymerizing said compound with added sulfur dioxide to produce said resin-containing latex, coagulating said latex, and obtaining a resin product therefrom, preparing a further quantity of said resin-containing latex and coagulating the same by adding to it in a finely divided form at least a portion of the said resin product and heating and stirring the admixture thus obtained to effect its coagulation, obtaining resin from said coagulated mass and molding said resin to obtain said transparent resin product.

7. The coagulation of a resin-containing latex prepared by emulsion polymerization of 1-butene and sulfur dioxide which comprises adding to said latex previously produced finely divided coagulated 1-butene-sulfur dioxide resin, stirring, and heating the admixture to effect its coagulation, the proportion of the added resin being sufficient to cause the said coagulation at a temperature not substantially in excess of about 65° C.

8. A coagulation of a resin-containing latex according to claim 7 wherein a portion of wet filter cake resulting from the polymerization of 1-butene and sulfur dioxide is added as the previously produced finely divided 1-butene-sulfur dioxide resin.

9. A method for producing a resin product which comprises preparing an aqueous emulsion of an unsaturated organic compound polymerizable with sulfur dioxide to produce a resin-containing latex, polymerizing said compound with added sulfur dioxide to produce said resin-containing latex and then effecting coagulation of said latex by admixture therewith of a sub-divided coagulated olefin-sulfur dioxide resin.

10. A method according to claim 9 wherein the sub-divided olefin-sulfur dioxide resin admixed with said latex is recovered from a polymerization as claimed in said claim.

11. A method according to claim 9 wherein a second coagulating agent is employed in addition to said subdivided olefin-sulfur dioxide resin.

12. A method for producing a resin product which comprises preparing an aqueous emulsion of an unsaturated organic compound polymerizable with sulfur dioxide to produce a resin-containing latex, polymerizing said compound with sulfur dioxide to produce said resin-containing latex and then effecting coagulation of the resin in said latex by admixture with the latex of a coagulated subdivided or finely divided resin produced by polymerizing an unsaturated organic compound with sulfur dioxide.

13. A method according to claim 12 wherein a second coagulating agent is employed in addition to said subdivided or finely divided resin.

14. A method according to claim 12 wherein a small amount of a sulfate ion-producing material is employed as an additional coagulating agent.

References Cited in the file of this patent

UNITED STATES PATENTS

| Number | Name | Date |
|---|---|---|
| 2,128,932 | Fitch | Sept. 6, 1938 |
| 2,587,945 | Wirth | Mar. 4, 1952 |
| 2,593,414 | Crouch | Apr. 22, 1952 |
| 2,607,750 | Wilson | Aug. 19, 1952 |